United States Patent [19]

Igura

[11] Patent Number: 4,524,407

[45] Date of Patent: Jun. 18, 1985

[54] DEVICE FOR ADJUSTING THE INCLINATION OF THE LIGHT AXIS OF A HEADLAMP FOR MOTOR VEHICLES

[75] Inventor: Kenkichi Igura, Fujisawa, Japan

[73] Assignee: Ichikoh Industries, Ltd., Tokyo, Japan

[21] Appl. No.: 639,318

[22] Filed: Aug. 10, 1984

[30] Foreign Application Priority Data

Aug. 16, 1983 [JP] Japan .......................... 58-126165[U]
Aug. 29, 1983 [JP] Japan .......................... 58-132167[U]

[51] Int. Cl.³ .............................................. F21V 3/18
[52] U.S. Cl. ................................... 362/66; 362/270; 362/273; 362/371; 362/430
[58] Field of Search ................. 362/66, 270, 273, 371, 362/430

[56] References Cited

U.S. PATENT DOCUMENTS

| | | | |
|---|---|---|---|
| 4,186,427 | 1/1980 | Ishikawa et al. | 362/270 X |
| 4,271,456 | 6/1981 | Dick | 362/66 |
| 4,306,276 | 12/1981 | Dick | 362/66 |
| 4,309,740 | 1/1982 | Takata | 362/66 |

*Primary Examiner*—Peter A. Nelson
*Attorney, Agent, or Firm*—Schwartz, Jeffery, Schwaab, Mack, Blumenthal & Evans

[57] ABSTRACT

A device for adjusting the inclination of the light axis of a headlamp for motor vehicles comprising a level-adjusting mechanism including a casing, a driver mechanism having a motor housed in the casing, a hollow gear operationally connected to the driver mechanism and located in the casing in such a way that it is rotated at a certain position in the casing by means of the driver mechanism, a cylindrical body inserted into the hollow gear and moved linearly when the hollow gear is rotated, a converter mechanism for converting the rotation of the hollow gear to a force which causes the cylindrical body to move linearly, and an adjusting rod arranged through the cylindrical body and reciprocated in association with the movement of the cylindrical body to adjust the light axis of the headlamp; and aim-adjusting mechanism having a connecting rod, which is connected, at one end thereof, to the adjusting rod of the level-adjusting mechanism through a first universal coupling mechanism, arranged coaxially with the adjusting rod, connected, at the middle portion thereof, to the headlamp through a second universal coupling mechanism, and extended, at the other end thereof, from the front side of the headlamp for hand-operated adjustment, wherein the light axis of the headlamp can be aim-adjusted by hand-operating the connecting rod from the front side of the headlamp.

6 Claims, 8 Drawing Figures

DEVICE FOR ADJUSTING THE INCLINATION OF THE LIGHT AXIS OF A HEADLAMP FOR MOTOR VEHICLES

BACKGROUND OF THE INVENTION

1. Field of the Invention

The present invention relates to a device for adjusting the inclination of the light axis of a headlamp for motor vehicles.

2. Description of the Prior Art

The headlamps of a motor vehicle or car are needed to light ahead the car in such a way that the driver can drive the car without hindrance and that the light of headlamps of the car which is driven by the driver cannot dazzle those who drive cars coming up on the reverse lane.

The headlamps attached to the car in the course of car assembly are therefore aiming-adjusted to exactly direct their light axes ahead so as not to dazzle the drivers who drive cars coming up on the reverse lane but to achieve easy driving. The inclination of the light axes of the headlamps change, however, depending upon the carrying conditions such as number of persons boarded and weight of cargo loaded. Namely, they are shifted upward when a heavy cargo is loaded on the back of the car but downward when it is loaded on the front of the car. When they are shifted upward, they dazzle those who drive cars coming up on the reverse lane, while they are shifted downward the driver who drives the car feels it uneasy to drive the car because they are forced to light relatively near and ahead the car.

The conventional headlamp for motor vehicles is therefore provided with a device for adjusting the inclination of the light axis to return the light axis to its previously-set position when it is shifted upward or downward from its previously-set position, depending upon various changes of car condition.

As disclosed by the British Pat. No. 2,089,958, for example, there is conventionally well known a device for adjusting the inclination of the light axis wherein the aiming and levelling mechanisms are housed in a casing to form a unit. The device of this type is however located at the back of the headlamp and the operation of hand operating section for carrying out the aiming adjustment is also done from the back of the headlamp.

When the aiming adjustment is carried out in the case of this type device wherein the hand operating section is operated like this from the back of the headlamp, it is needed that the bonnet of the bar is opened to do the adjusting work in the engine room. However, the engine room is filled with various parts such as the engine, battery, radiator cooling fan, and fan belt, thereby making it troublesome to do the adjusting work. In addition, it may happen that those who do the adjusting work in the complicated engine room contact the battery and are struck by electric shock.

SUMMARY OF THE INVENTION

The present invention is therefore intended to eliminate the above-mentioned drawbacks and an object of the present invention is to provide a device for adjusting the inclination of the light axis of a headlamp capable of achieving the aiming and levelling adjustments and easy to do the adjusting work.

Another object of the present invention is to provide a device for adjusting the inclination of the light axis of a headlamp particularly easy to do the aiming adjustment work and capable of safely doing the adjustment work without being struck by electric shock.

A further object of the present invention is to provide a device for adjusting the inclination of the light axis of a headlamp, said device being provided with a detector means for making it possible to detect, with high accuracy, the adjusted amount at the time of the levelling adjustment.

A still further object of the present invention is to provide a device for adjusting the inclination of the light axis of a headlamp, compact in size, small in number of parts used, easy in attaching the device to the headlamp, and smallest in the space which the device attached occupies.

A still further object of the present invention is to provide a device for adjusting the inclination of the light axis of a headlamp, novel in construction and having aimin and levelling functions.

These and other objects of the present invention will become apparent from the following detailed description in reference with the accompanying drawings.

DESCRIPTION OF THE PREFERRED EMBODIMENTS

Some examples of the device for adjusting the inclination of the light axis of a headlamp according to the present invention will be described referring to the accompanying drawings.

Figure 1:
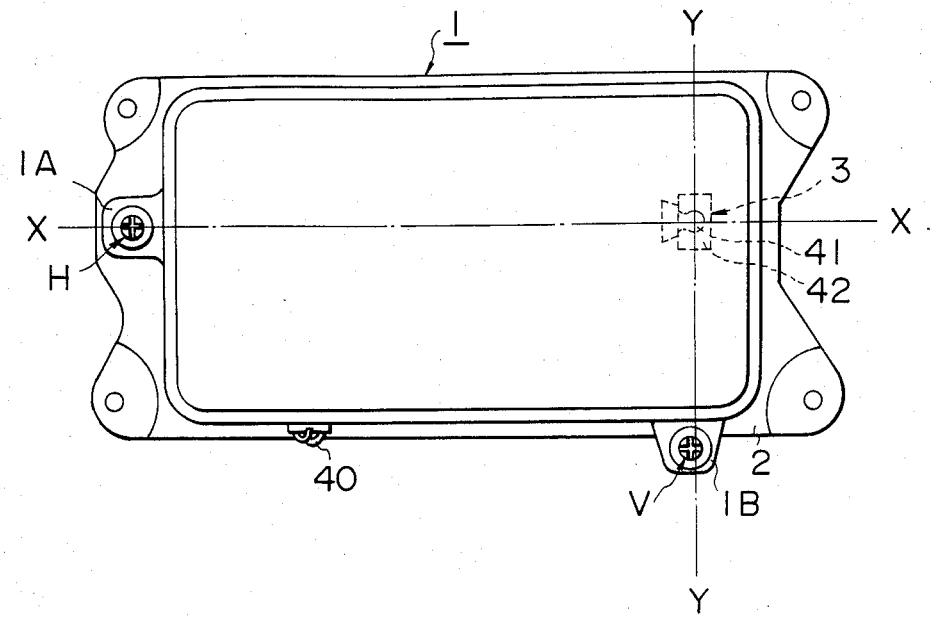
FIG. 1 is a front view of the headlamp into which a device for adjusting the inclination of the light axis according to the present invention is incorporated.
Figure 2:
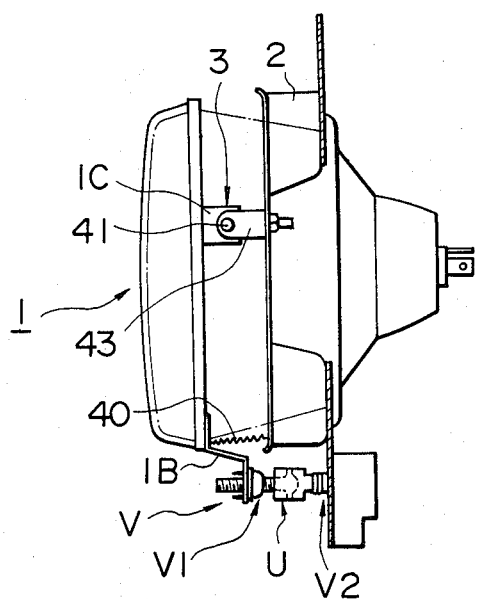
FIG. 2 is a side view of the headlamp shown in FIG. 1.
Figure 3:
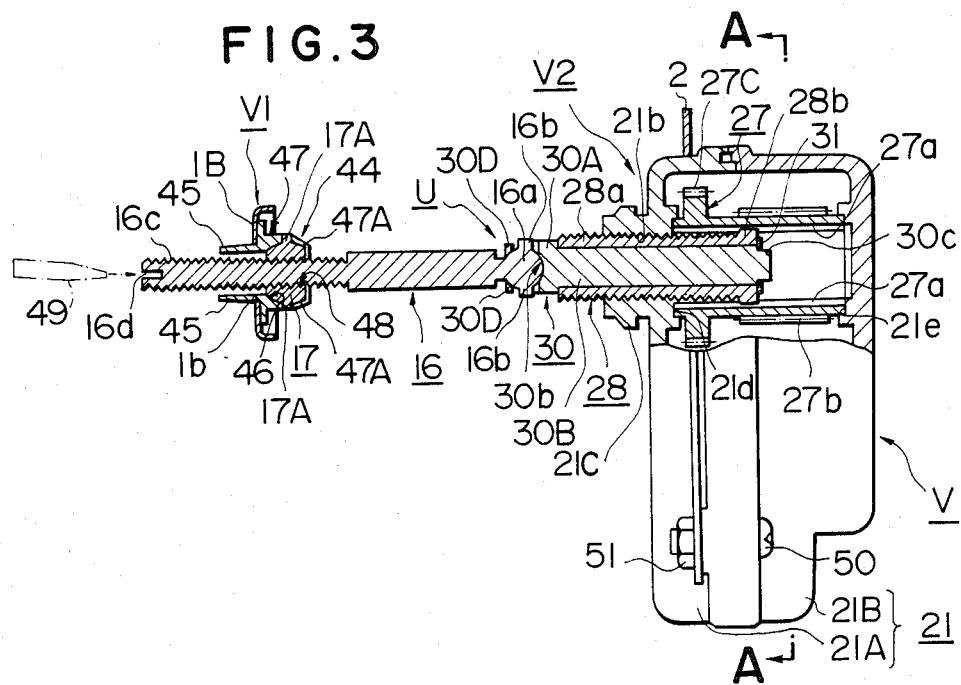
FIG. 3 is similar to FIG. 2 but enlarged in scale and sectioned partly, showing a first example of the device for adjusting the inclination of the light axis according to the present invention.
Figure 4:
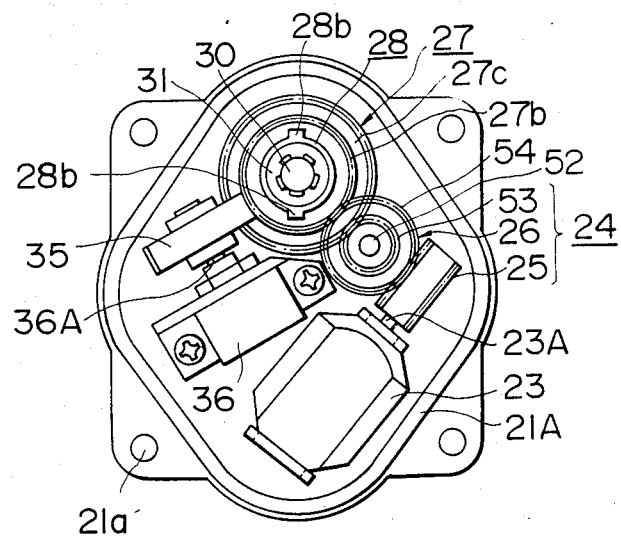
FIG. 4 is a sectional view taken along the line A—A in FIG. 3 and viewed in the direction A, leaving the second casing half removed.
Figure 5:
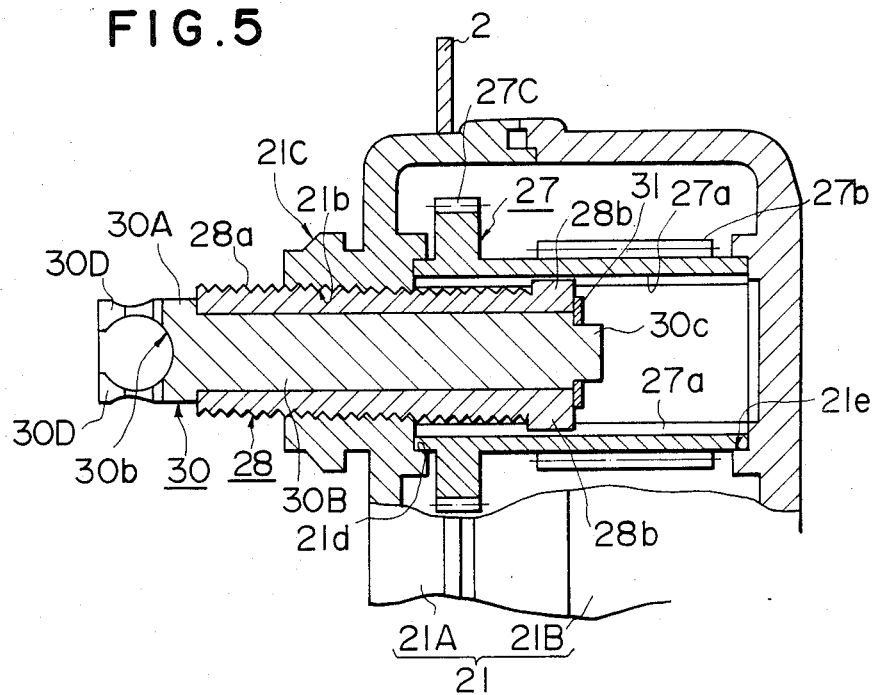
FIG. 5 is similar to FIG. 3 but partly enlarged in scale.
Figure 6:
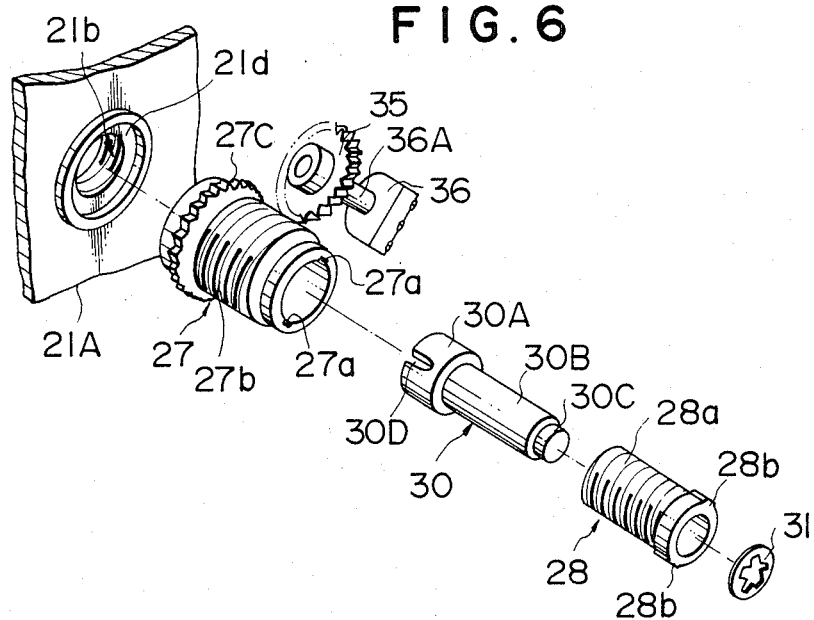
FIG. 6 is a perspective view showing main parts in FIG. 5 dismantled.

FIGS. 1 and 2 schematically show a headlamp for motor vehicles into which a device for adjusting the inclination of the light axis according to the present invention is incorporated, and numeral 1 represents the headlamp in these Figures. This headlamp 1 is provided with brackets 1A, 1B and 1C. The headlamp 1 is supported, freely rotatable, by a publicly-known fulcrum mechanism 3 which comprises snap-engaging a socket member 42 fixed to the bracket 1C at the back of the headlamp 1 with a ball member 41 fixed to a bracket 2 through an attachment member 43, said bracket 2 being fixed to a vehicle or car body. The headlamp 1 is also supported by a means H for adjusting the light axis of the headlamp 1 in right and left directions around a vertical line Y—Y and located on a horizontal line X—X which passes through the fulcrum mechanism 3, and means V for adjusting the inclination of the light axis of the headlamp 1 up and down around the horizontal line X—X and located on the vertical line Y—Y which also passes through the fulcrum mechanism 3. The headlamp 1 is also urged toward the bracket 2 (or backward) by a tension spring 40 whose one end is hooked to the headlamp 1 while the other end thereof to the bracket 2. Since the adjusting means H is publicly well known, it will not be described in detail.

The above-mentioned adjusting means V represents a device for adjusting the inclination of the light axis according to the present invention, and said light axis adjusting device V comprises a follower section V1 located on the side of the bracket 1B, and a driver section V2 attached to the bracket 2, said follower and driver sections V1 and V2 are connected each other through a universal joint.

FIGS. 3 through 6 show the construction of the device V for adjusting the inclination of the light axis in detail, wherein the follower section V1 comprises a mounting 47, ball joint 17 and connecting rod 16, said mounting 47 being made of synthetic resin and having a pair of elastic engagement pieces 45 at the front end thereof, a spherical through-hole 46 formed therein, and a pair of slits 47A, 47A cut off in the axial direction thereof at its end portion opposite to that one at which the engagement pieces 45, 45 are located; said ball joint 17 having a spherical outer face corresponding to the spherical through-hole 46 in the mounting 47, projected pins 17A, 17A which are engaged with the slits 47A, 47A when the ball joint 17 is snapped into the through-hole 46, and a threaded through-hole 48 formed therein; and said connecting rod 16 having a threaded portion 16C which is screwed through the through-hole 48 in the ball joint 17, a driver recess 16d which is formed on the end face of one end thereof located on the front side of the headlamp 1 and into which a driver 49 is inserted, and a ball portion 16a formed at the other end thereof and provided with a pair of projected pins 16b, 16b on the outer circumferential face thereof. The follower section V1 is attached to the headlamp 1 by fitting the engagement pieces 45, 45 of the mounting 47 into a through-hole 1b in the bracket 1B located on the side of the headlamp. The driver section V2 comprises a housing 21 which is formed by a casing 21A and a cover 21B detachably attached to the casing 21A, and a motor 23, deceleration mechanism 24, hollow gear 27, cylindrical member 28, piston rod 30 and the like which are housed in the housing 21, respectively. The driver section V2 is fixed to the bracket 2 when the casing 21A is fixed to the bracket 2 by inserting a bolt 50 into a through-hole 21a of the casing 21A and into another one (not shown) of the bracket 2 which corresponds to the through-hole 21a of the casing 21A, and then screwing a nut 51 onto the bolt 50. A cylindrical portion 21C provided with a through-hole 21b, on the inner face of which is formed a female screw thread, is arranged at the upper front wall of the casing 21A, passing through this upper front wall. The hollow gear 27 is made cylindrical as a whole and has a worm gear 27b and collar-like spur gear 27c formed on the outer circumferential face while it also has a pair of sliding guide recesses 27a, 27a formed along its axial direction on its inner circumferential face. One end of the hollow gear 27 is fitted into a circular recess 21d on the cylindrical portion 21C of the casing 21A, while the other end thereof into a circular recess 21e of the cover 21B which corresponds to the recess 21d of the casing 21A, so that the hollow gear 27 can be supported, rotatable, by the housing 21 through the recesses 21d, 21e. The cylindrical member or body 28 has a male screw thread 28a formed on the outer circumferential face thereof and screwed into the female-screw-threaded through-hole 21b of the cylindrical portion 21C, and it also has a pair of engaging projections 28b, 28b which are slidably engaged with the sliding guide recesses 27a, 27a of the hollow gear 27. Therefore, the cylindrical body 28 is projected from the housing 21 at a part of its front end, passing through the female-screw-threaded throught-hole 21b, while located in the hollow gear 27 at its back end, and its engaging projections 28b, 28b are slidably engaged with the sliding guide recesses 27a, 27a. When the hollow gear 27 is rotated, the cylindrical body 28 rotates together with the hollow gear 27 and can be replaced forward and backward by the female-screw-thread through-hole 21b, depending upon the rotating direction of the hollow gear 27. However, the cylindrical body 28 is allowed by the sliding guide recesses 27a, 27a to freely move in the axial direction thereof in relation to the hollow gear 27, so that only the cylindrical body 28 can move forward and backward. The piston rod 30 comprises a main portion 30B rotatably fitted into the cylindrical body 28, and a small-diameter portion 30C at that end thereof which is projected from one end of the cylindrical body 28. The piston 30 is inserted into the cylindrical body 28, with the small-diameter portion 30C thereof located at the top, until a large-diameter portion 30A thereof strikes against the end face of the other end of the cylindrical body 28, and a clip 31 is fitted onto and engaged with the small-diameter portion 30C which is projected from the one end of the cylindrical body 28, so that the piston 30 can be supported by the cylindrical body 28 to rotate in relation to the cylindrical body 28 but move in the axial direction thereof together with the cylindrical body 28. The large-diameter portion 30A of the piston rod 30 is provided with a spherical socket 30b in which the ball portion 16a of the connecting rod 16 is received, and slits 30D, 30D cut off along the axis thereof from the opening side of the spherical socket 30b. The ball portion 16a of the connecting rod 16 is received in the spherical socket 30b in such a way that the projected pins 16b, 16b on the ball portion 16a are engaged with the slits 30D, 30D. The connecting rod 16 rotates together with the piston rod 30 and they form a universal coupling means U which can swing between them. The motor 23 is fixed to the inner wall of the casing 21A and a worm gear 25 is fixed to the rotating shaft 23A of the motor 23. The worm gear 25 is engaged with a wheel gear 54 of a gear body 26 which is formed by the wheel gear 54 and a spur gear 53, and forms the deceleration mechanism 24 together with these wheel and spur gears 54 and 53. The gear body 26 is rotatably supported by a shaft 52 embedded in the casing 21A, and the spur gear 53 is engaged with the spur gear 27c of the hollow gear 27.

When the motor 23 is rotated, its rotation is transmitted to the cylindrical body 28 via the worm gear 25 and gear body 26. Numeral 36 represents a potentiometer fixed to the casing 21A, and numeral 35 denotes a wheel gear fixed to a rotation shaft 36A of the potentiometer 36. The wheel gear 35 is engaged with the worm gear 27b on the outer circumferential face of the cylindrical body 28. The potentiometer 36 forms a position detecting means for generating electric signal responsive to the rotation amount of the cylindrical body 28 when the rotation amount of the cylindrical body 28 is transmitted to the rotation shaft 36A via the hollow and wheel gears 27, 35 to rotate the rotation shaft 36A.

In the case of the light axis adjusting device V constructed like this, the so-called aiming adjustment for adjusting initial light axis at the time of attaching the headlamp 1 to the car body through the bracket 2 is carried out as described below:

When the driver 49 is inserted into the driver recess 16d at that end of the connecting rod 16 which is projected from the front face of the headlamp 1, and the connecting rod 16 is rotated together with the driver 49, the piston rod 30 which is connected to the connecting rod 16 through the universal coupling means U is also rotated. Since the piston rod 30 is made rotatable relative to the cylindrical body 28, however, the cylindrical body 28 is left not rotated. More specifically, the piston rod 30 is not shifted relative to the bracket 2 but held at a certain position, thereby leaving the driver section V2 inoperative. When the connecting rod 16 rotates, it will be seen in the follower section V1 that the ball joint 17 having that screw thread on its inner face which is engaged with the outer face screw thread portion 16c of the connecting rod 16 is forced to move forward and backward, depending upon the rotating direction of the connecting rod 16. When the ball joint 17 is moved forward and backward, the headlamp 1 which is connected to the ball joint 17 through a ball joint means 44 including the ball joint 17 and mounting 47 is swung forward and backward around the fulcrum mechanism 3 to change the light axis thereof up and down in relation to the car body, thereby enabling the initial light axis to be adjusted.

This hand-operating aiming adjustment is carried out by advancing an adjusting tool such as the driver 49 to the connecting rod 16 from the front side of the headlamp 1. In the method of carrying out the adjustment from the back side of the headlamp 1, for example, it was necessary to open the bonnet of the car and do the adjusting work from the side of the engine room which was filled with the engine, battery, radiator and the like, thereby making it troublesome to do the adjusting work and sometimes causing the operator to be contacted with the battery and struck by electric shock. On the contrary, the hand-operated aiming adjustment according to the present invention makes it unnecessary to open the bonnet at the time of the adjusting work, thereby guaranteeing excellent workability and safety.

According to the device V for adjusting the inclination of the ight axis, the levelling adjustment of the light axis which changed depending upon the carrying conditions of the car is achieved as desribed below.

When the inclination of the light axis of the headlamp 1 is changed by a carrying condition, the driver recognizes the change of the inclination of the light axis, operates an operating means (not shown) located on the side of the driver's seat, and selects current flow supplied to the motor 23, depending upon whether the light axis is directed too upward or downward, to thereby rotate the motor 23 in normal or reverse direction. When the motor 23 rotates, its rotation is transmitted to the hollow gear 27, described above, and the cylindrical body 28 is rotated together with the hollow gear 27. When the cylindrical body 28 is rotated, it is forced to move forward and backward by the female-screw-threaded through-hole 21b of the casing 21A, depending upon the rotating direction of the motor 23, and the piston rod 30 is shifted forward and backward together with it. Since free rotation is allowed between the piston rod 30 and it, its rotation is not transmitted to the piston rod 30. When the piston rod 30 is shifted like this, the connecting rod 16 which is connected to the piston rod 30 via the universal coupling means U is also shifted together with the piston rod 30, and this shift of the connecting rod 16 is transmitted to the headlamp 1 through the ball joint means 44, so that the headlamp 1 is swung forward and backward around the fulcrum mechanism 3 by an amount corresponding to the shifted connecting rod 16 to thereby change the inclination of its light axis up and down in relation to the car body. When the inclination of the light axis of the headlamp relative to objects ahead and outside the car has been changed from its initially set position, therefore, it can be returned to the position, which has been initially set in relation to the objects ahead and outside the car, by determining the shifted amount.

The rotating angle of the hollow gear 27 is proportional to the forward or backward shifted amount of the piston rod 30, and the potentiometer 36 can pick up the amount of rotating angle of the hollow gear 27 as an electric signal. This electric signal can teach us the inclined amount of the light axis practically caused between the initially set light axis and the shifted one in relation to the car body. The electric signal can also be used in displaying whether the light axis has been adjusted upward or downward in relation to the car body from its initially set position, and automatically controlling the inclination of the light axis to its initially set position when its adjusted amount has been recognized and the carrying condition has returned to the initial one.

Figure 7:
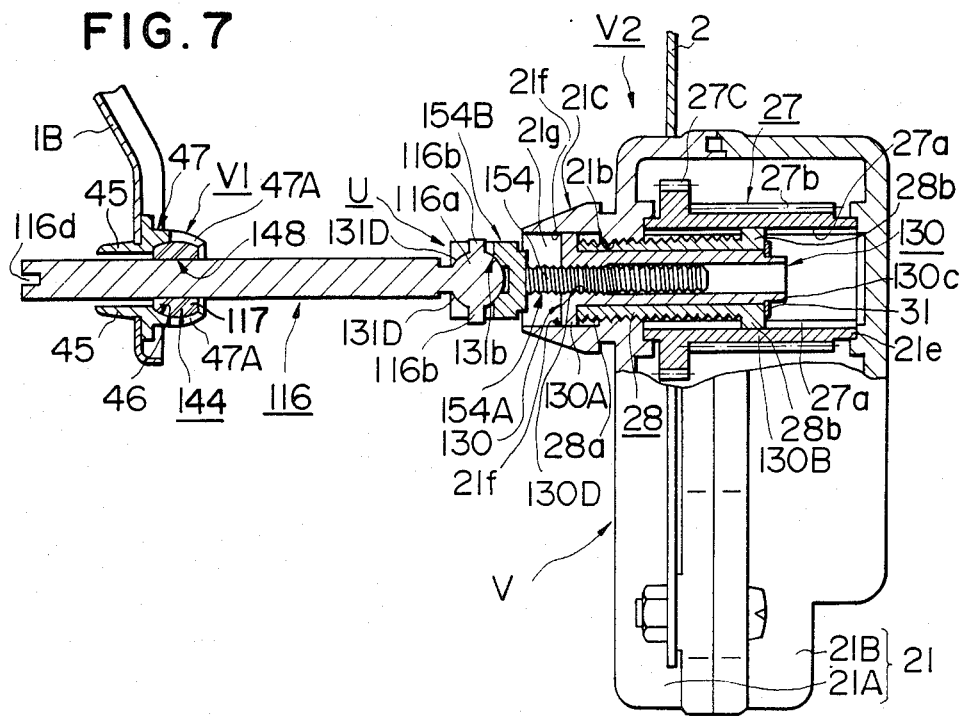
FIG. 7 is an enlarged view, partly sectioned, showing a second example of the device for adjusting the inclination of the light axis according to the present invention.
Figure 8:
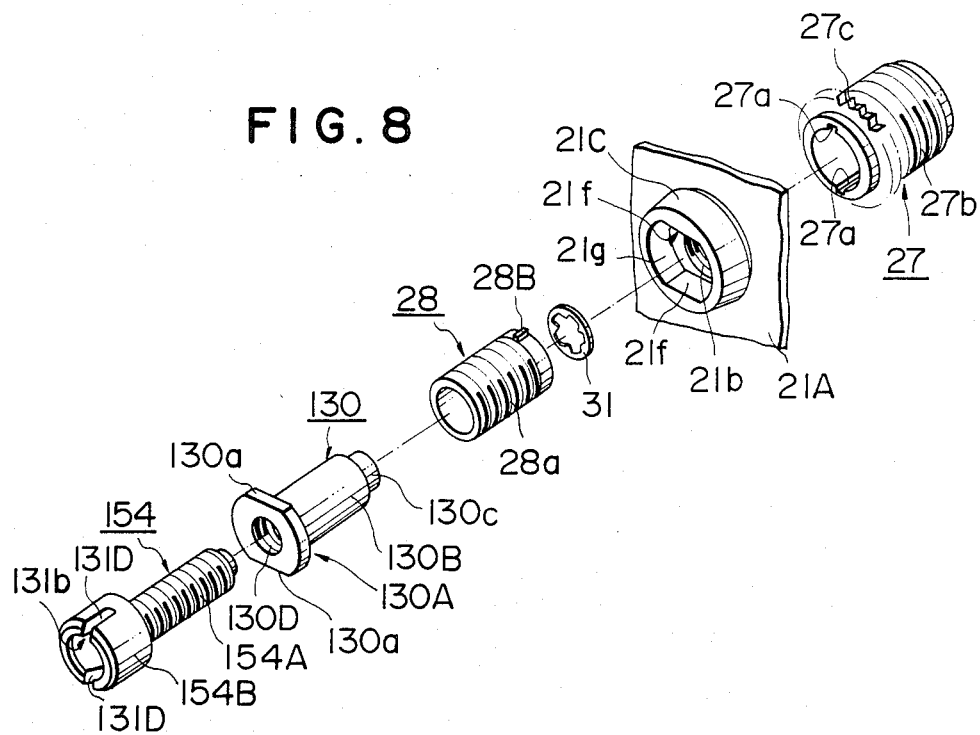
FIG. 8 is a perspective view showing main parts in FIG. 7 dismantled.

FIGS. 7 and 8 show a second example of the light axis adjusting device V, wherein same parts as those in the first embodiment will be represented by same numerals and description on these parts will be omitted.

In the case of this second embodiment, too, the light axis adjusting device V comprises the follower section V1 attached to the bracket 1B, and the driver section V2 attached to the bracket 2, said follower and driver sections being connected to each other by means of the universal coupling means U.

The follower section V1 comprises the mounting 47 fixed to the bracket 1B; a ball joint 117 made spherical to correspond to the inner spherical circumference of the through-hole 46 in the mounting 47 and having a through-hole 148 formed therein; and a connecting rod 116 passing through the through-hole 148 in the ball joint 117 and having the ball joint 117 fixed thereon, said connecting rod 116 further having a driver recess 116d which is formed on the end face of one end thereof located on the front side of the headlamp 1 and into which the driver 49 is to be inserted to adjust the inclination of the light axis of the headlamp 1, and a ball portion 116a which is formed at the other end thereof, having a pair of projected pins 116b, 116b on its outer circumferential face. The ball joint 117 is rotated together with the connecting rod 116 when the latter rotates. However, the ball joint 117 is adapted to freely rotate in relation to the mounting 47 and the mounting 47 therefore allows the connecting rod 116 to freely rotate but move together with the mounting 47 in the axial direction of the connecting rod 116. The ball joint 117 may be formed integral to the connecting rod 116.

The driver section V2 comprises the housing 21 and motor 23, deceleration mechanism 24, hollow gear 27, cylindrical body 28, a piston rod 130, screw rod 154 and the like housed in the housing 21. Although the motor 23 and deceleration mechanism 24 are not shown in FIGS. 7 and 8, the system of transmitting power to finally rotate the hollow gear 27 is quite same as in the first embodiment. The casing 21A is provided with a female-screw-threaded through-hole 21b and circular recess 21d at its cylindrical portion 21C. In addition, the recess 21g is formed at the front end of the casing 21A, and flat faces 21f, 21f which are parallel to the axis are formed on the inner circumferential face of the recess 21g. The piston rod 130 is made cylindrical and comprises a main portion 130B rotatably fitted into the cylindrical body 28, a large-diameter portion 130A extended from one end of the cylindrical body 28 and arranged in the recess 21g, and a small-diameter portion 130C formed at that end of the piston rod 130 which is extended from the other end of the cylindrical body 28. The piston rod 130 further includes a female-screw-thread 130D formed on the inner circumferential face, and flat faces 130a, 130a formed on its large-diameter portion 130a, corresponding to the flat faces 21f, 21f of the recess 21g, said large-diameter portion 130A having a contour substantially same as the inner circumference of the recess 21g. The clip 31 is fitted onto the small-diameter portion 130C of the piston rod 130 extended from that end of the cylindrical body 28 which is opposite to the large-diameter portion 130A thereof. The piston rod 130 can be thus supported by the cylindrical body 28 in such a way that the cylindrical body 28 is allowed to freely rotate in relation to the piston rod 130 but move together with the piston rod 130 in the axial direction. The screw rod 154 has a male screw thread 154A formed on its outer circumferential face and screwed into the female screw thread 130D of the piston rod 130. The screw rod 154 also has a large-diameter portion 154B formed at its front end which is extended from one end of the piston rod 130. The large-diameter portion 154B is provided with a spherical socket 131b in which the ball portion 116a of the connecting rod 116 is received, and slits 131D, 131D which are cut off from the opening side of the spherical socket 131b along the axial direction of the screw rod 154. The ball portion 116a of the connecting rod 116 is received in the spherical socket 131b in such a way that the projected pins 116b, 116b on the ball portion 116a are engaged with the slits 131D, 131D. Therefore, the donnecting rod 116 is rotated together with the screw rod 154, and the universal coupling means U is formed, swingable between the both members 116 and 154.

The aiming adjustment will be carried out as follows, using the second example of the device V for adjusting the inclination of the light axis which is arranged as described above.

When the connecting rod 116 is rotated by the driver 49 which has been inserted into the driver groove 116D formed at one end of the connecting rod 116 extending from the front side of the headlamp 1, the screw rod 154 which is connected to the connecting rod 116 via the universal coupling means U is also rotated. Even when the screw rod 154 is rotated, the rotation of the piston rod 130 into which the screw rod 154 is screwed is prevented by the recess 21g of the casing 21A. Therefore, the screw rod 154 is forced into the piston rod 130, so that the screw rod 154 can be moved forward and backward in relation to the piston rod 130, depending upon the rotating direction of the connecting rod 116. When the piston rod is moved forward and backward, the headlamp 1 which is connected to the ball joint 117 via the ball joint means 144 including the ball joint 117 and mounting 47 is swung forward and backward around the fulcrum mechanism 3 to adjust its light axis up and down in relation to the car body and return it to its initially set position. Even in the case of this hand-operated aiming adjustment by the second example of the device V for adjusting the inclination of the light axis, the adjusting tool 49 can be inserted into the headlamp 1 from the front side thereof.

The levelling adjustment will be carried out as described below.

When the inclination of the light axis of the headlamp 1 is changed by some carrying condition of the car, the driver recognizes the change of the inclination of the light axis, operates an operating means (not shown) located on the side of the driver's seat, and selects the rotating direction of the motor 23 similarly to the case of the first embodiment, according to whether the light axis is directed too upward or downward, to thereby rotate the hollow gear 27 together with the cylindrical body 28. When the cylindrical body 28 is rotated, it is forced by the female-screw-threaded through-hole 21b of the casing 21A to move forward and backward, according to the rotating direction of the motor 23, and the piston rod 130 is shifted forward and backward together with the cylindrical body 28. However, free rotation is allowed between the piston rod 130 and the cylindrical body 28 and the rotation of the piston rod 130 is prevented by the recess 21g. The rotation of the cylindrical body 28 is not therefore transmitted to the piston rod 130, leaving the piston rod 130 not rotated. When the piston rod 130 is shifted like this in the axial direction thereof, both of the screw rod 154 which is screwed into the piston rod 130, and of the connecting rod 116 which is connected to the piston rod 130 through the universal coupling means U are shifted together with the piston rod 130 in the axial direction. Therefore, this shift is transmitted to the headlamp 1 through the ball joint means 144 and the headlamp 1 is thus swung forward and backward around the fulcrum mechanism 3 only by the amount of this shift to thereby adjust its light axis upward and downward in relation to the car body. When the light axis of the headlamp relative to the objects ahead and outside the car is changed from its initially set position by some carrying condition of the car, therefore, it can be returned to its initially set position by determining the amount of the above-mentioned shift.

Needless to say, the potentiometer 36 can be provided, engaging the wheel gear 35 with the worm gear 27 of the hollow gear 27, and the amount of rotating angle of the hollow gear 27 can be picked up as an electric signal from the potentiometer 36, even with this second embodiment and same as in the case of the first embodiment.

Although the universal coupling means U has been formed by the ball joint 16a (or 116a) located on the side of the connecting rod 16 (or 116), and by the spherical socket 30b (or 131b) located on the side of the piston rod 30 or screw rod 154 in both cases of the first and second embodiments, the ball joint 16a (or 116a) and spherical socket 30b (or 131b) may be changed in their position, the ball joint to the position of the spherical socket while the spherical socket to the position of the ball joint.

Although the invention has been described in its preferred form with a certain degree of particularity, it is understood that the present disclosure of the preferred embodiments are made by way of example and that various modifications in the details of construction may be resorted to without departing from the true spirit and scope of the invention. It is intended that the patent shall cover, by suitable expression in the appended claims whatever features of patentable novelty exist in the invention disclosed.

What is claimed is:

1. A device for adjusting the inclination of the light axis of a headlamp for motor vehicles comprising:
   a level-adjusting means including
   a casing;
   a driver mans having a motor housed in the casing;
   a hollow gear means operationally connected to the driver means and located in the casing in such a way that it is rotated at a certain position in the casing by means of the driver means;
   a cylindrical means inserted into the hollow gear means and moved linearly when the hollow gear means is rotated;
   a converter means for converting the rotation of the hollow gear means to a force which causes the cylindrical body means to move linearly; and
   an adjusting rod means arranged through the cylindrical means and reciprocated in association with the movement of the cylindrical body means to adjust the light axis of the headlamp,
   and
   aim-adjusting means having a connecting rod, which is connected, at one end thereof, to the adjusting rod means of the level-adjusting means through a first universal coupling means, arranged coaxially with the adjusting rod means, arranged coaxially with the adjusting rod means, connected at the middle portion thereof, to the headlamp through a second universal coupling means, and extended, at the ofhter end thereof, from the front side of the headlamp for hand-operated adjustment.

2. A device for adjusting the inclination of the light axis of a headlamp for motor vehicles according to claim 1 wherein said converter means transmits the rotation force of the hollow gear means to the cylindrical means, using a groove formed, along the axial direction, on one of the inner circumferential face of the hollow gear means and the outer circumferential face of the cylindrical means which face each other, and also using a projection formed on the other of the inner and outer circumferential faces and slidably engaged with the goove, and wherein said converter means converts the rotation force of the hollow gear means to an operational force which causes the cylindrical means to move in the axial direction, the rotation force of the hollow gear means being transmitted to the cylindrical means by means of a female screw thread formed on the inner face of a through-hole in the wall of the casing, and by means of a male screw thread formed on the outer circumferential face of the cylindrical means and screwed into the female screw thread.

3. A device for adjusting the inclination of the light axis of a headlamp for motor vehicles according to claim 1 wherein said adjusting rod means is associated with the linear movement of the cylindrical body means but left free from the rotation thereof, and wherein said connecting rod means has a male screw thread formed on that outer circumferential face thereof at which said connecting rod means is connected to the second universal coupling means, and said second universal coupling means has a female screw thread formed on the inner circumferential face thereof and into which the male screw thread is screwed at this connected portion, and wherein a ball joint means is moved in the axial direction of the connecting rod means according to the amount of rotation of the connecting rod to thereby swing the headlamp.

4. A device for adjusting the inclination of the light axis of a headlamp for motor vehicles according to claim 1 wherein said adjusting rod means includes a cylindrical piston rod having a female screw thread on the inner circumferential face thereof, and a screw rod means having a male screw thread on the outer circumferential face thereof, screwed into the piston rod, and connected to the connecting rod through the first universal coupling means.

5. A device for adjusting the inclination of the light axis of a headlamp for motor vehicles according to claim 1 said second universal coupling means comprises a mounting and a ball joint freely rotatable in the mounting, and one of the mounting and ball joint is fixed to the headlamp while the other to the connecting rod.

6. A device for adjusting the inclination of the light axis of a headlamp for motor vehicles according to claim 1 wherein a worm gear is formed on the outer circumferential face of the hollow gear means, and engaged with this worm gear is another worm gear which is fixed to the shaft of a detector means, which generates an electric signal responsive to the amount of rotation of the hollow gear means.

* * * * *